United States Patent Office 3,075,849
Patented Jan. 29, 1963

3,075,849
PROCESS OF RETARDING SEDIMENTATION OF PIGMENTS IN FILM-FORMING COATING MATERIALS, AND COMPOSITIONS
Emil Dreher, Uberlingen (Bodensee), and Fritz Raeck and Karl Bolz, Konstanz (Bodensee), Germany, assignors to Byk-Gulden Lomberg Chemische Fabrik G.m.b.H., Konstanz (Bodensee), Germany, a corporation of Germany
No Drawing. Filed Mar. 30, 1959, Ser. No. 802,641
8 Claims. (Cl. 106—177)

The present invention relates to a suspending agent for pigment-containing lacquers and other film-forming coating materials, to a process of preventing sedimentation and dry-caking of pigments and other finely pulverized fillers in such lacquers and film-forming coating materials, and to a process of preparing such suspending agents.

The present application is a continuation-in-part of copending application Serial No. 750,597, filed on July 24, 1958, now U.S. Patent No. 2,973,382, and entitled "Salts of Acid Diesters of Polyglycols With Organic Bases, and Process of Making and Using Same."

Paints, enamels, and lacquers, containing pigments as well as other film-forming plastic solutions, emulsions, and dispersions have the disadvantage that the pigments and other filler materials frequently settle on prolonged storage, thus causing sedimentation and dry-caking of pigment in the can. It is evident that such sedimentation and dry-caking render proper application of such coating materials rather difficult and often cause flow or sag of the material as applied.

To prevent such sedimentation there has been suggested the addition of a number of suspending agents of different chemical composition to such paints, enamels, lacquers, and the like coating materials, high molecular wax-like materials, such as metal soaps, alcohol sulfonates, other anionic or cationic surface active agents, and the like. Salts of fatty acids with low-molecular amines and more particularly with low-molecular hydroxy amines have also been used for this purpose. These salts prevent sedimentation of pigments in lacquers in the presence of small amounts of water.

Such known suspending agents, however, have often an adverse effect upon the properties of the coating obtained on applying such coating materials. For instance, they reduce the strength properties of the coating, its adherence to the coating surface, the fastness to light of such coatings, its resistance to moisture and water, and the like.

It is one object of the present invention to provide new and valuable suspending agents for pigment-containing lacquers, paints, enamels, film-forming plastic solutions, emulsions, dispersions and the like coating materials, which suspending agents are free of the disadvantages of the known suspending agents and prevent sedimentation and dry-caking of pigments and other finely pulverized fillers in such coating materials.

Another object of the present invention is to provide a process of preventing sedimentation and dry-caking of pigments and other finely pulverized fillers in pigment-containing paints, enamels, lacquers, film-forming plastic solutions, dispersions, suspensions, and other coating materials.

A further object of the present invention is to provide new and valuable salts of specific high-molecular organic bases with inorganic or organic acids or compounds of acid reaction, which salts are useful suspending agents for pigment-containing paints, enamels, lacquers and other pigment-containing film-forming plastic solutions, emulsions, dispersions, and the like coating materials.

Still another object of the present invention is to provide a simple and effective process of producing such new and valuable salts of high-molecular organic bases with inorganic acids or with compounds of acid reaction.

Other objects of the present invention and advantageous features thereof will become apparent as the description proceeds.

In principle, the present invention relates to new salts which have proved to be excellent suspending agents for pigment-containing paints, enamels, lacquers and other film-forming compositions. Said salts are salts of high-molecular organic bases, such as polyamines or basic polyamides, with inorganic or organic acids and, more particularly, with phosphoric acids, diesters of glycols or polyglycols wherein part of the hydroxyl groups is esterified with saturated or unsaturated fatty acids having 10–18 carbon atoms and the remainder with saturated or unsaturated dicarboxylic acids. The basic polyamide is for instance, the condensation product of a polyamine such as ethylene diamine with dimeric or trimeric unsaturated fatty acids, such as linoleic acid. Such polyamides are sold, for instance, under the trademark "Nordac."

The new salts are prepared, according to the present invention, by reacting, for instance, polyamides with such inorganic or organic acids or compounds of acid reaction. The preferred salts, however, are salts of acids with basic condensation products of polyamines with unsaturated fatty acids of the consistency of a soft resin, which basic condensation products are used in place of the polyamines for salt formation.

As stated above, phosphoric acids are suitable inorganic acid components of the new salts. Higher molecular unsaturated fatty acids and their polyester-derivatives with polyalcohols have proved to be especially suitable organic acids for salt formation. The acid diesters of glycol and polyglycols which are prepared by first reacting said glycols and polyglycols with a saturated or unsaturated fatty acid having 10 to 18 carbon atoms and subsequently with saturated or unsaturated dicarboxylic acid are also valuable acid components of the new salts.

Salt formation is preferably effected in polar and non-polar solvents wherein the new salts are soluble. The resulting solution can directly be added as suspending and anti-sedimentation agent to the lacquers and other film-forming compositions.

The acid diesters of glycol and polyglycols are prepared, for instance, by heating a mixture of the polyalkylene glycol compound and a fatty acid, for instance, a fatty acid mixture obtained from tall oil, castor oil, or the like, to a temperature of about 205° C. in the presence of a dehydrating agent such as boric acid anhydride, while passing nitrogen through the reaction mixture. After the calculated amount of water has been distilled off, the resulting mono-ester compound is cooled to about 140° C. The di- or polycarboxylic acid compound is then added and the mixture is again heated to about 220° C. in the presence of boric acid anhydride while passing nitrogen therethrough. As soon as mono-esterification of the di- or polycarboxylic acid is completed, the mixture is cooled. The resulting oily di-ester is then mixed with the stoichiometric amount of the respective polyamine or basic condensation product of such a polyamine with an unsaturated fatty acid, preferably in the presence of an organic solvent, such as xylene or mixtures of xylene and butanol.

The new salts are quite soluble in both polar and non-polar organic solvents. They do not have any adverse effect upon the lacquer and the like film or coating. On the contrary, due to their high molecular structure they are well compatible with many lacquer ingredients. In the dry lacquer film or coating they behave like materials related to the lacquer film or coating. On baking they become frequently a component of the lacquer film or coating due to the cross-linkage with the film-forming material.

The new salts do not produce any of the adverse effects of known anti-sedimentation agents upon the lacquer film, such as swelling, retardation of the drying process, causing disturbances in the flow of the lacquer and the like coating composition, and even rust-formation underneath the lacquer film or coating. Ordinarily addition of an amount of 0.2% to 1.0% of said new suspending salt, calculated for the solid content of the paint, enamel, lacquer, and other film-forming composition, is sufficient to reliably prevent any sedimenation of the solid matter contained therein for a prolonged period of time. The salts are preferably added to the lacquer and other film-forming compositions in the form of their solutions in suitable lacquer solvents. Such solutions may be added during the manufacture of the lacquer and the like film-forming composition or after their manufacture. If the solution is added during the manufacturing process, such addition facilitates also wetting of the pigments and has a viscosity lowering effect.

It is, of course, understood that not only neutral salts can be produced, but also basic salts or acid salts by varying the amount of acid added to the basic component. As a result thereof, the new salts can be used for lacquer and the like film-forming compositions of the most varied composition by selecting the most suitable different solvents for each type of coating composition.

The new suspending salts can also be used in mixture with other suitable suspending agents and, especially with the salts of acid diesters of polyalkylene glycols having a free carboxyl group in their molecule, with low-molecular tertiary water-insoluble organic amines. Such salts correspond, for instance, to the following formula

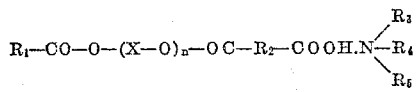

wherein:

X is an alkylene radical with 2 to 3 carbon atoms;
$R_1$ represents a member selected from the group consisting of a saturated alkyl radical having 11 to 23 carbon atoms, a saturated alkyl radical having 11 to 23 carbon atoms and being substituted by a hydroxyl group, an unsaturated alkyl radical having 11 to 23 carbon atoms, and an unsaturated alkyl radical having 11 to 23 carbon atoms and being substituted by a hydroxyl group;
$R_2$ represents a member selected from the group consisting of a phenylene radical, a saturated alkylene radical, a saturated alkylene radical substituted by a member selected from the group consisting of a hydroxyl group and a carboxyl group, an unsaturated alkylene radical, and an unsaturated alkylene radical substituted by a member selected from the group consisting of a hydroxyl group and a carboxyl group, said saturated and unsaturated alkylene radicals having 2 to 3 carbon atoms;
$R_3$ and $R_4$ represent members selected from the group consisting of hydrogen, a lower alkyl radical, a lower alkyl radical substituted by a hydroxyl group, and a cyclohexyl radical; and
$R_5$ represents a member selected from the group consisting of a lower alkyl radical substituted by a hydroxyl group, and a cyclohexyl radical, while
$n$ is an integer ranging from 4 to 25.

Especially suitable salts of this type are the salts of polyethylene glycol diesters of tall oil fatty acids, castor oily fatty acids, linseed oil fatty acids, on the one hand, and maleic acid, and on the other hand, with dimethyl cyclohexylamine, cyclohexylamine, triethanolamine and the like amines. The preferred acid components of said salt are diesters of polyalkylene glycols wherein the one of its ester groups is a fatty acid ester group and the other one is a polycarboxylic acid monoester group. Such compounds are disclosed and claimed in copending application Serial No. 750,597 of Emil Dreher, filed July 24, 1958, and entitled "Salts of Acid Diesters of Polyglycols With Organic Bases, and Process of Making and Using Same."

The following examples serve to illustrate the preparation of the new salts and of solutions thereof as well as their use as suspending agents in pigment-containing paints, enamels, lacquers, film-forming plastic solutions, emulsions, dispersions, or other coating materials, without, however, limiting the invention to said examples.

*Example 1*

200 g. (1 mole) of polyethylene glycol with an average molecular weight of 200 and 286 g. (1 mole) of castor oil fatty acids are gradually heated to 200° C. in the presence of 0.6 g. of boric acid anhydride, while passing nitrogen through the reaction mixture. The mixture is kept at said temperature until the stoichiometric amount of water is distilled off. The resulting mono-ester is cooled to 140° C. and 98 g. (1 mole) of maleic acid anhydride are added thereto. The mixture is again gradually heated to and kept at 200° C. for 1 hour. The reaction product is allowed to cool, whereby the acid oily diester is obtained in the form of a dark viscous oil.

33.2 kg. of said acid diester are dissolved in 20 kg. of xylene. A solution of 16.8 kg. of a basic polyamide of soft resinlike consistency with an H-active equivalent weight of 300, as sold under the trademark "Laromid R," in 22 kg. of xylene and 8 kg. of butanol are gradually added thereto while stirring. The temperature during addition is maintained between about 40° C. and about 50° C. Subsequently, stirring of the mixture is continued at said temperature for 2 hours. In this manner a 50% solution of the neutral salt is obtained.

The H-active equivalent weight of 300 mentioned hereinabove indicates that 300 parts, by weight, of "Laromid R" are neutralized by one gram-mole of hydrogen ions, i.e. by one mold of a monobasic acid.

The basic polyamide "Laromid R" is the reaction product of lower aliphatic polyamines, such as ethylene diamine, diethylene triamine, or triethylene tetramine with monomeric unsaturated fatty acids such as linoleic acid, castor oil fatty acids, tall oil fatty acids, and mixtures thereof.

0.5 kg. of said solution are added to 100 kg. of a synthetic resin lacquer paint containing chrome yellow and blanc fixe. Said synthetic resin lacquer paint has the following composition:

200 g. of chrome yellow,
200 g. of barite (blanc fixe),
100 g. of zinc oxide,
235 g. of linseed oil modified alkyd resin (sold under the trademark "Alkydal L extra"),
250 g. of white spirit,
50 g. of turpentine,
30 g. of xylene,
10 g. of butanol,
10 g. of a 50% (w./v.) solution of xylenols dissolved in dipentene,
10 g. of a 33% (w./v.) solution of cobalt-lead-manganese naphthenate dissolved in xylene.

The resulting lacquer does not show sedimentation of the pigments for several months. Without the addition of the suspending salt according to this example, a solid hard cake of the pigments is formed after standing for 7 days.

Addition of the new suspending salt, does not in the least impair the advantageous properties of the base lacquer and film formation.

*Example 2*

A solution of 28.1 kg. of the same basic polyamide as used in Example 1, in 25 kg. of xylene and 5 kg. of butanol are added to a solution of 21.9 kg. of tall oil fatty acids in 20 kg. of xylene. The temperature and the other reaction conditions are the same as used in Example 1. A 50% light yellow, viscous, odorless solution of the corresponding neutral salt is obtained thereby.

0.4 kg. of said salt solution is added to a lacquer containing 100 kg. of solid matter. The lacquer used has the following composition:

75 g. of linseed oil,
75 g. of tung oil,
150 g. of copal resin,
1200 g. of linseed oil-modified alkyd resin "Alkydal L extra,"
1000 g. of white spirit,
150 g. of xylene, and
50 g. of butanol.

To each 470 g. of such a synthetic resin lacquer there are added:

200 g. of chrome yellow,
200 g. of barite (Blanc fixe),
100 g. of zinc oxide,
150 g. of white spirit,
30 g. of turpentine,
15 g. of xylene,
5 g. of butanol, and
10 g. of a 33% (w./v.) solution of cobalt-lead-manganese naphthenate in xylene.

The salt addition has an excellent sedimentation inhibiting effect.

*Example 3*

A solution of 14.2 kg. of the basic polyamide used in Example 1 in 24.1 kg. of butanol and 24.1 kg. of xylene is added to 11.6 kg. of 85% ortho-phosphoric acid while stirring. The temperature during addition is maintained below 80° C. by cooling. Thereby, a slightly yellow viscous solution of a pH of 7.0 is obtained.

A pigment-containing priming varnish consisting of 21 kg. of chrome yellow, 21 kg. of barite, 5.3 kg. of titanium dioxide, and 52.7 kg. of a nitro cellulose lacquer is adusted to a viscosity of 50 seconds/20° C., determined in the Ford beaker 4 mm., by the addition of a sufficient amount of a mixture of 10 kg. of acetic acid butyl ester, 25 kg. of acetic acid ethyl ester, 2 kg. of butanol, 4 kg. of ethanol, 4 kg. of xylene, and 8 kg. of toluene. The unpigmented nitro cellulose lacquer has the following composition:

200 g. of collodion cotton E 730,
288 g. of collodion cotton E 330,
128 g. of propyl glycol ether,
96 g. of glycolic acid butyl ester,
60 g. of dibutyl phthalate,
1400 g. of acetic acid ethyl ester,
640 g. of acetic acid butyl ester,
256 g. of butanol,
1703 g. of toluene,
100 g. of xylene,
310 g. of a mixture of—
  5% of lactic acid ethyl ester,
  5% of glycolic acid butyl ester, and
  90% of cymene,
152 g. of benzene (pure),
88 g. of the resinous condensation product of carbamic acid butyl ester with formaldehyde, sold under the trademark "Uresin B,"
124 g. of lactic acid ethyl ester,
600 g. of ethanol,
769 g. of an oil-modified dried alkyd resin containing 58% of phthalate and 42% of dehydrated ricinoleic acid, sold under the trademark "Beckosol 5."

0.5 kg. of the above mentioned solution of the salt of ortho-phosphoric acid with the basic polyamide are added to said priming varnish. The addition prevents sedimentation of the pigments on storage for several months. Without addition of the salt according to the present invention there is obtained a hard sediment after a short period of time. The resulting lacquer film obtained with such a priming varnish according to the present invention is homogeneous and insensitive to water.

Of course, the salt solutions obtained according to the present invention can be diluted with other solvents, for instance, with hydrocarbon fillers, such as petroleum solvent naphta with 90–95% of aromatic components, cymene, toluene, dipentene, methyl isobutyl ketone, ethyl amyl ketone, butyl acetate, and the like.

In place of tall oil fatty acids used in example 2, there may be employed other fatty acids, such as castor oil fatty acids, linseed oil fatty acids, other fatty acids having 10 to 24 carbon atoms, such as lauric acid, palmitic acid, stearic acid, arachic acid, lignoceric acid, oleic acid, erucic acid, linoleic acid, linolenic acid, eleostearic acid, ricinoleic acid, and other natural or synthetic saturated or unsaturated, hydroxy-substituted or unsubstituted fatty acids, or mixtures thereof, or the mixtures obtained by saponification of natural oils or fats, such as rape seed oil, cotton seed oil, tung oil, peanut oil, sunflower oil, oiticica oils, fish oils, soybean oil, and others.

The same acids may also be used for esterifying the polyalkylene glycols. Such polyalkylene glycols can be straight-chain or branched polyalkylene glycols, for instance, polypropylene-1,3-glycols, polypropylene-1,2-glycols, polyethylene glycols, preferably having a molecular weight between about 200 and about 1000, and others.

In place of maleic acid anhydride used in Example 1 as the other esterifying acid component, there may be employed phthalic acid anhydride, citric acid, tartaric acid, glutaric acid, fumaric acid, succinic acid, pyrotartaric acid, itaconic acid, malic acid, aspartic acid, glutamic acid, isophthalic acid, terephthalic acid, and other di- and polycarboxylic acids which may be substituted by hydroxyl or carboxyl groups.

In place of the higher basic polyamide used in the preceding examples, there may be employed other higher basic polyamides, as they are obtained by reaction of dimeric or trimeric unsaturated fatty acids such as linoleic acid with ethylene diamine, diethylene triamine, triethylene tetramine, or higher polyamines as they are obtained by reaction of 1 mole of an epoxy resin with 2 moles of a lower polyamine of the general formula:

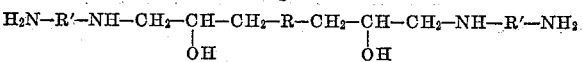

wherein R' indicates radicals of the formulas:

or, respectively,

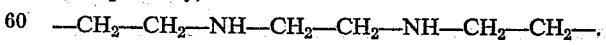

Such reaction products are described, for instance, by Lee in his book on "Epoxy Resins."

The suspending agents according to the present invention cannot only be used with advantage in nitro cellulose or synthetic resin lacquers as shown in the preceding examples, but also in other film-forming compositions, such as nitro-cellulose combination lacquers, spirit varnishes, acid hardening lacquers, lacquers based on ester and/or ketone soluble polymers, lacquers based on addition polymers, and others.

Of course, many changes and variations in the composition of the new suspending salt, the polyamines and basic polyamides used for forming the salts with inorganic and organic acid and compounds of acid reaction,

We claim:

1. The process of preventing sedimentation of pigments in pigmented paints, lacquers, and other film-forming coating compositions, said process consisting in admixing to such a pigmented composition at any stage of its manufacture, as the suspending and pigment sedimentation inhibiting agent, between about 0.2% and about 1.0%, calculated for the solid matter content of such a coating composition, of the salt of the basic polyamide of an aliphatic polyamine with 2 to 6 carbon atoms and 2 to 4 amino groups and an unsaturated higher fatty acid with 10 to 18 carbon atoms, with an acid compound selected from the group consisting of phosphoric acid, a higher fatty acid with 10 to 18 carbon atoms, and the acid diester of a polyalkylene glcol, the one ester group of said diester being a higher fatty acid ester group with 10 to 18 carbon atoms and the other ester group being a polycarboxylic acid mono-ester group.

2. The process of preventing sedimentation of pigments in pigmented paints, lacquers, and other film-forming coating compositions, said process consisting in admixing to such a pigmented composition at any stage of its manufacture, as the suspending and pigment sedimentation inhibiting agent, between about 0.2% and about 1.0%, calculated for the solid matter content of such a coating composition, of the salt of the basic polyamide of an aliphatic polyamine with 2 to 6 carbon atoms and 2 to 4 amino groups, and an unsaturated higher fatty acid with 10 to 18 carbon atoms, with phosphoric acid.

3. The process of preventing sedimentation of pigments in pigmented paints, lacquers, and other film-forming coating compositions, said process consisting in admixing to such a pigmented composition at any stage of its manufacture, as the suspending and pigment sedimentation inhibiting agent, between about 0.2% and about 1.0%, calculated for the solid matter content of such a coating composition, of the salt of the basic polyamide of an aliphatic polyamine with 2 to 6 carbon atoms and 2 to 4 amino groups, and an unsaturated higher fatty acid with 10 to 18 carbon atoms, with the acid diester of a polyalkylene glycol, the one ester group of said diester being a higher fatty acid ester group with 10 to 18 carbon atoms and the other ester group being a polycarboxylic acid mono-ester group.

4. The process of preventing sedimentation of pigments in pigmented paints, lacquers, and other film-forming coating compositions, said process consisting in admixing to such a pigmented composition at any stage of its manufacture, as the suspending and pigment sedimentation inhibiting agent, between about 0.2% and about 1.0%, calculated for the solid matter content of such a coating composition, of the salt of the basic polyamide of an aliphatic polyamine with 2 to 6 carbon atoms and 2 to 4 amino groups and an unsaturated higher fatty acid with 10 to 18 carbon atoms, with a higher fatty acid.

5. A pigmented paint, lacquer, and the like pigmented film-forming coating composition of high stability on storage, said pigmented coating composition comprising a vehicle, a finely divided pigment intimately and uniformly distributed throughout and suspended in said vehicle, and, as the suspending and pigment sedimentation retarding agent, between about 0.2% and about 1.0%, calculated for the solid matter content of such a coating composition, of the salt of the basic polyamide of an aliphatic polyamine with 2 to 6 carbon atoms and 2 to 4 amino groups and an unsaturated higher fatty acid with 10 to 18 carbon atoms, with an acid compound selected from the group consisting of phosphoric acid, a higher fatty acid, and the acid diester of a polyalkylene glycol, the one ester group of said diester being a higher fatty acid ester group with 10 to 18 carbon atoms and the other ester group being a polycarboxylic acid mono-ester group.

6. A pigmented paint, lacquer, and the like pigmented film-forming coating composition of high stability on storage, said pigmented coating composition comprising a vehicle, a finley divided pigment intimately and uniformly distributed throughout and suspended in said vehicle, and, as the suspending and pigment sedimentation retarding agent between about 0.2% and about 1.0%, calculated for the solid matter content of such a coating composition, of the salt of the basic polyamide of an aliphatic polyamine with 2 to 6 carbon atoms and 2 to 4 amino groups and an unsaturated higher fatty acid with 10 to 18 carbon atoms, with phosphoric acid.

7. A pigmented paint, lacquer, and the like pigmented film-forming coating composition of high stability on storage, said pigmented coating composition comprising a vehicle, a finely divided pigment intimately and uniformly distributed throughout and suspended in said vehicle, and, as the suspending and pigment sedimentation retarding agent, between about 0.2% and about 1.0%, calculated for the solid matter content of such a coating composition, of the salt of the basic polyamide of an aliphatic polyamine with 2 to 6 carbon atoms and 2 to 4 amino groups and an unsaturated higher fatty acid with 10 to 18 carbon atoms, with the acid diester of a polyalkylene glycol, the one ester group of said diester being a higher fatty acid ester group with 10 to 18 carbon atoms and the other ester group being a polycarboxylic acid mono-ester group.

8. A pigmented paint, lacquer, and the like pigmented film-forming coating composition of high stability on storage, said pigmented coating composition comprising a vehicle, a finely divided pigment intimately and uniformly distributed throughout and suspended in said vehicle, and, as the suspending and pigment sedimentation retarding agent, between about 0.2% and about 1.0%, calculated for the solid matter content of such a coating composition, of the salt of the basic polyamide of an aliphatic polyamine with 2 to 6 carbon atoms and 2 to 4 amino groups and an unsaturated higher fatty acid with 10 to to 18 carbon atoms, with a higher fatty acid.

References Cited in the file of this patent

UNITED STATES PATENTS

| | | |
|---|---|---|
| 2,371,866 | Barrett | Mar. 20, 1945 |
| 2,379,507 | Deyrup | July 3, 1945 |
| 2,522,488 | Bersworth | Sept. 19, 1950 |
| 2,540,678 | Kelly | Feb. 6, 1951 |
| 2,632,770 | Hunter | Mar. 24, 1953 |
| 2,764,601 | Garceau | Sept. 25, 1956 |
| 2,824,018 | Cornwell | Feb. 18, 1958 |
| 2,852,406 | Riegler et al. | Sept. 16, 1958 |
| 2,888,416 | Giness et al. | May 26, 1959 |
| 2,971,922 | Clem | Feb. 14, 1961 |
| 2,982,665 | Wilcox | May 2, 1961 |
| 2,999,080 | Wilcox | Sept. 5, 1961 |
| 3,000,750 | Feilelschin | Sept. 19, 1961 |